United States Patent Office 3,352,946
Patented Nov. 14, 1967

3,352,946
DISULFONYLAZIDE CROSSLINKED POLYPRO-
PYLENE - POLYETHYLENE - ETHYLENE/PRO-
PYLENE RUBBER BLENDS
Jimmy S. Dew, Bartlesville, Okla., assignor to Phillips
Petroleum Company, a corporation of Delaware
No Drawing. Filed Nov. 15, 1965, Ser. No. 507,686
3 Claims. (Cl. 260—897)

ABSTRACT OF THE DISCLOSURE

Polymer blends exhibiting good physical properties are formed by crosslinking a blend of polypropylene, polyethylene and amorphous ethylene-propylene copolymer.

---

This invention relates to an improved blend of resins. In one aspect, the invention relates to a blend of polypropylene having high impact strength.

Resinous polymers of propylene and methods for production thereof are well known. Crystalline polypropylene has desirable properties as an injection molding resin. It has relatively good heat resistance. One problem connected with polypropylene, however, is its loss of impact strength at temperatures below about 20° C. (68° F.).

In the prior art, attempts have been made to improve the impact strength of polypropylene by blending therewith other olefin polymers such as ethylene-propylene copolymers. While this attack on the problem of impact strength has been moderately successful, the improvement in impact strength is accompanied by a deterioration of certain other properties, notably flexural modulus and, in some cases, tensile strength.

An object of this invention is to provide an improved polypropylene blend. A further object is to improve the impact strength of polypropylene blends. An additional object is to improve the impact strength of polypropylene blends while minimizing deterioration in other valuable properties. Other objects and advantages will become apparent to those skilled in the art upon reading this disclosure.

According to this invention, there is provided an improved polypropylene blend comprising polypropylene and two different ethylene polymers. One of the ethylene polymers is a crystalline polymer of ethylene. This definition includes homopolymers of ethylene, which can have crystallinities as high as 92 percent or higher (as determined by X-ray diffraction) and copolymers of ethylene with relatively minor amounts of higher 1-olefins such as propylene, 1-butene, or butadiene. The latter copolymers have crystallinities of approximately 80 percent or higher. The other ethylene polymer according to this invention is a copolymer of ethylene and propylene in which the propylene units constitute at least about 50 weight percent of the copolymer. These copolymers are preponderantly and essentially emorphous and are vulcanizable to form rubbery materials.

The blends of my invention comprise from 2 to 10 weight percent of an amorphous, elastomeric, vulcanizable copolymer of ethylene and propylene and the remainder crystalline polypropylene and a preponderantly crystalline polymer of ethylene. The weight ratio of polypropylene to the latter-mentioned ethylene polymer is in the range 15:1 to 0.67:1. Highly satisfactory results are obtainable in a preferred range of 10:1 to 5:1. The ternary copolymer blends according to this invention have higher impact strengths than a binary blend of polypropylene with the crystalline ethylene polymer or a binary blend of polypropylene with the amorphous elastomeric copolymer of ethylene and propylene. In addition, the decrease in flexural modulus and tensile strength is significantly less than is obtained with the binary blends.

In addition, I have found that the properties of these blends are further improved by crosslinking same with an azide crosslinking agent at temperatures above 325° F. for times in excess of one minute. Preferably, 0.01 to 5 parts by weight of the azide crosslinking agent per 100 parts of blend is used. This preferred agent is cyclohexane-1,4-disulfonylazide although any azide of the formula

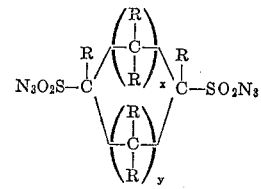

can be employed, wherein $x$ is a positive integer ranging from 2 to 9, inclusive; $y$ is a positive integer ranging from 0 to 9, inclusive; the sum of $x$ and $y$ ranges from 3 to 10, inclusive; wherein each R is selected from the group consisting of hydrogen and 1 to 3 carbon alkyl radicals and wherein the total number of carbon atoms in the molecule preferably does not exceed 20.

Some examples of compounds of the above general formula which can be employed as crosslinking agents according to the process of this invention are cyclopentane-1,3-di(sulfonylazide), cyclohexane-1,4-di(sulfonylazide), 5 - methylcyclopentane - 1,3 - di(sulfonylazide), 4-ethylcyclohexane-1,2-di(sulfonylazide), 1-methylcyclohexane-1,3-di(sulfonylazide), 4-ethylcyclohexane-1,4-di-(sulfonylazide), 6-n-propylcycloheptane-1,4-di(sulfonylazide, 2,4,6 - tri - n - propylcyclooctane - 1,3 - di(sulfonylazide), 2,2-diisopropylcyclononane-1,5-di(sulfonylazide), cyclodecane-1,6-di(sulfonylazide), 5,5,7-trimethylcycloundecane-1,4-di(sulfonylazide), cyclododecane-1,7-di(sulfonylazide), 1,3,5 - trimethylcyclododecane - 1,4 - di(sulfonylazide), 4-n-propylcyclooctane-1,2-di(sulfonylazide), cyclohexane-1,3-di(sulfonylazide), and the like. It is to be understood that these sulfonylazides can be of the cis- or trans-form.

The polypropylenes utilized in accordance with our invention have a density in the range 0.89 to 0.92 gram per cc. at 25° C. and a flexural modulus in the range 100,000 to 325,000 p.s.i. Preparation of such polypropylenes is described in French Patent 1,319,787 and British Patent 940,178, for example.

The crystalline ethylene polymers used in accordance with our invention have densities in the range 0.94 to 0.96 gram per cc. at 25° C. and melt indices in the range 0.2 to 100. These materials can be prepared, for example, as described in the United States Patent 2,825,721 (1958). In most instances, these polymers are ethylene homopolymers or copolymers of ethylene with minor amounts of propylene, 1-butene, butadiene, or other higher 1-olefins. Usually the higher olefin units incorporated into the copolymer molecule account for from 0.5 to 10 percent of the total copolymer weight. These materials are definitely crystalline at room temperature, as determined by X-ray diffraction. Generally the crystallinity ranges from about 80 percent in the case of the copolymers to about 92 percent or more in the case of the ethylene homopolymers.

The rubbery or elastomeric ethylene-propylene copolymers utilized in accordance with our invention are also known in the art. Generally, from 20 to 80 weight percent of the copolymer is contributed by the propylene comonomer units. The copolymer molecules usually contain at least 50 percent of their total weight in the form of incorporated propylene comonomer units. These copolymers are essentially amorphous as measured by X-ray diffraction at room temperature and are cross-linkable or vulcanizable by reaction with peroxides, such as cumene hydroperoxide and benzoyl peroxide, to form rubber-like materials. Also included are terpolymers of ethylene, propylene and small amounts of a third monomer which imparts unsaturation to the polymer molecule, such as dicyclopentadiene, and nonconjugated alkadienes. These terpolymers are sulfur-vulcanizable and are well known in the art. Examples of these copolymers and their preparation appear in United States Patents 2,933,480, 3,000,866–7, and 3,093,620–1. They frequently have a density in the range 0.85 to 0.92 gram per cc. at 25° C. and a Mooney viscosity in the range 20 to 120.

The polymeric materials in accordance with our invention can be blended by polymer blending methods known in the art. For example, they can be blended in a Banbury mixer, a roll mill, or a kneader such as those having a generally cylindrical barrel and a helical conveying element therein. Alternatively, the ingredients can be blended in the molten state or in solution in suitable solvents followed by removal of the solvent or solvents.

The blends in accordance with our invention are highly valuable materials for molding of various shaped items such as bowls, bottles, and the like.

*Example I*

Several blends were prepared utilizing three of the following polymers by blending in a Banbury mixer at 400° F. for 5 minutes:

(A) An ethylene-butene-1 copolymer made by the process of U.S. 2,825,721, and having a melt index (ASTM D1238–62T, Condition E) of 0.3, a density of 0.95 g/cc. (ASTM D1505–63T), and a crystallinity of 87 percent.

(B) An ethylene homopolymer made by the process of U.S. 2,825,721, and having a melt index of 0.9, a density of 0.96 g./cc., and a crystallinity of 94 percent.

(C) A propylene homopolymer made with hydrogen-modified diethylaluminum chloride-$TiCl_3 \cdot \frac{1}{3} AlCl_3$ catalyst, and having a melt flow (ASTM D1238–62T, Condition L) of about 5, a density of 0.905 g./cc., and a flexural modulus (ASTM D790–63) of 225,000.

(D) An ethylene-propylene (EP) rubber made by Enjay Chemical Company, and having a Mooney viscosity (ASTM D1646–63, ML–4, 212° F.) of 96, and a density of 0.86 g./cc.

Properties of blends containing 82.5 percent polypropylene (C above), 10 percent of ethylene polymer (either A or B above), and 7.5 percent EP rubber (D above) are tabulated below. In the crosslinked blends 0.03 part of cyclohexane-1,4-disulfonylazide per 100 parts of blend was used to effect crosslinking.

|  | Ethylene Polymer used | | | |
| --- | --- | --- | --- | --- |
|  | A | | B | |
| Crosslinked | No | Yes | No | Yes |
| Melt Flow [a] | 2.34 | 0.44 | 2.19 | 0.51 |
| Brittleness Temperature, ° F. [b] | −3 | −10 | −15 | −23 |
| Izod Impact, ft. lb./in., untouched [c]: | | | | |
| 73° F | 2.2 | 3.4 | 3.2 | 5.6 |
| 0° F | 13.8 | 14.1 | 12.0 | 18.0 |
| Tensile Strength, [d] 20 in./min | 3,517 | 3,627 | 3,450 | 3,700 |
| Flexural Modulus ×10³ [e] | 171 | 205 | 175 | 205 |
| Bottle Impact, 40° F., ft. to failure [f] | 4 | 6 | 4 | 6 |

[a] ASTM D1238–62T, Condition L.
[b] ASTM D746–57T.
[c] ASTM D256–56.
[d] ASTM D638–61T.
[e] ASTM D790–63.
[f] Plastics Technology 8, No. 1, page 34 (January 1962).

It is apparent that brittleness temperature, impact strength, tensile strength, and flexural modulus are all improved by the addition of the azide crosslinking agent, and that a stronger molded bottle is obtained.

Additives known in the art can be incorporated as desired into the blends according to this invention. Such additives include fillers, pigments, antioxidants, dyes, antistatic agents, nucleating agents, ultra-violet light absorbers and the like.

Reasonable variations and modifications are possible within the scope of this disclosure without departing from the spirit and scope of the invention.

I claim:

1. An improved crosslinked polypropylene blend composition which comprises a mixture of crystalline polypropylene, a crystalline ethylene polymer, and 2 to 10 weight percent of an amorphous, elastomeric, vulcanizable copolymer of ethylene and propylene, the weight ratio of said polypropylene to said polyethylene being in the range of 15:1 to 0.67:1; said mixture crosslinked with a compound selected from an azide of the formula $$N_3O_2S-C\begin{pmatrix}R\\|\\R\end{pmatrix}\begin{pmatrix}R\\|\\C\\|\\R\end{pmatrix}_x\begin{pmatrix}R\\|\\C\\|\\R\end{pmatrix}_y C-SO_2N_3$$

wherein $x$ is a positive integer ranging from 2 to 9, inclusive; $y$ is a positive integer ranging from 0 to 9, inclusive; the sum of $x$ and $y$ ranges from 3 to 10, inclusive; wherein each R is selected from the group consisting of hydrogen and 1 to 3 carbon alkyl radicals and wherein the total number of carbon atoms in the molecule preferably does not exceed 20.

2. An improved polypropylene blend composition according to claim 1 which comprises a mixture of 82.5 percent polypropylene having a melt flow of about 5, 10 percent polyethylene having a density of 0.95 g./cc. and 7.5 percent amorphous copolymer of ethylene and propylene having a density of 0.86 g./cc. crosslinked with 0.03 part of cyclohexane-1,4-disulfonylazide per 100 parts of blend.

3. An improved polypropylene blend composition according to claim 1 which comprises a mixture of 82.5 percent polypropylene having a melt flow of about 5, 10 percent ethylene-butene-1 copolymer having a density of 0.95 g./cc. and 7.5 percent amorphous copolymer of ethylene and propylene having a density of 0.86 g./cc. crosslinked with 0.03 part of cyclohexane-1,4-disulfonylazide per 100 parts of blend.

References Cited

UNITED STATES PATENTS

| 3,058,944 | 10/1962 | Breslow | 260—79.3 |
| 3,137,672 | 6/1964 | Lehane | 260—897 |
| 3,250,825 | 5/1966 | Martinovitch | 260—897 |
| 3,256,367 | 6/1966 | Jayne | 260—897 |

SAMUEL H. BLECH, *Primary Examiner.*

T. G. FIELD, Jr., *Assistant Examiner.*